(12) United States Patent
Tanaka

(10) Patent No.: US 8,000,393 B2
(45) Date of Patent: Aug. 16, 2011

(54) VIDEO ENCODING APPARATUS AND VIDEO ENCODING METHOD

(75) Inventor: Takahiro Tanaka, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/568,429

(22) Filed: Sep. 28, 2009

(65) Prior Publication Data

US 2010/0135397 A1  Jun. 3, 2010

(30) Foreign Application Priority Data

Nov. 28, 2008  (JP) ................ 2008-305291

(51) Int. Cl.
*H04B 1/66* (2006.01)
(52) U.S. Cl. ............................. 375/240.16
(58) Field of Classification Search ......... 375/240.15–240.19; *H04B 1/66*
See application file for complete search history.

(56) References Cited

U.S. PATENT DOCUMENTS 5,526,052 A * 6/1996 Ar .................. 375/240.03

FOREIGN PATENT DOCUMENTS

| JP | 05-111015 | 4/1993 |
| JP | 06-217292 | 8/1994 |
| JP | 08-181992 | 7/1996 |
| JP | 11-098510 | 4/1999 |
| JP | 2000-078563 A | 3/2000 |
| JP | 2006-129067 A | 5/2006 |
| JP | 2007-006390 | 1/2007 |

OTHER PUBLICATIONS

Explanation of Non-English Language References.

* cited by examiner

*Primary Examiner* — Tung Vo
(74) *Attorney, Agent, or Firm* — Knobbe, Martens, Olson & Bear LLP

(57) ABSTRACT

According to one embodiment, a video encoding apparatus includes a motion vector calculation module, a motion boundary detection module, and a quantization parameter setting module. The motion vector calculation module calculates motion vectors for respective blocks in an input image. The motion boundary detection module detects a motion boundary between a motion region and a still region in the input image based on the motion vectors of the respective blocks. The quantization parameter setting module sets a value of a quantization parameter used to quantize a block that borders the detected motion boundary to a value smaller than a value which is set when the block does not border the motion boundary in accordance with a detection result of the motion boundary.

9 Claims, 9 Drawing Sheets

VIDEO ENCODING APPARATUS AND VIDEO ENCODING METHOD

CROSS-REFERENCE TO RELATED APPLICATIONS

This application is based upon and claims the benefit of priority from Japanese Patent Application No. 2008-305291, filed Nov. 28, 2008, the entire contents of which are incorporated herein by reference.

BACKGROUND

1. Field

One embodiment of the invention relates to a video encoding apparatus and video encoding method.

2. Description of the Related Art

A video encoding technique required to transmit and store a video signal to have a smaller data size has been put into practical use, as represented by, e.g., the MPEG2 video standard.

In the MPEG2 video standard, one image is divided into blocks each of 8×8 pixels, discrete cosine transformation (DCT) as one of orthogonal transformations is applied to respective blocks, and obtained DCT coefficients are quantized to attain variable-length encoding, thus compressing the image. Using motion-compensated prediction together, the encoding efficiency can be improved using correlation of an image in the time axis direction.

The motion-compensated prediction includes intra-frame prediction and inter-frame prediction. In video encoding, the inter-frame prediction predicts a motion by referring to an encoded frame, and can normally encode video data with higher efficiency than the intra-frame prediction.

By setting quantization parameters used in quantization according to visual characteristics, degradation of image quality due to video encoding can be eliminated.

Jpn. Pat. Appln. KOKAI Publication No. 2006-129067 discloses a video encoding apparatus, which eliminates degradation of image quality due to quantization using an adaptive quantization method which calculates activities of macroblocks (blocks) each including a predetermined number of pixels, and sets smaller quantization parameters as activities are low.

The video encoding apparatus disclosed in Jpn. Pat. Appln. KOKAI Publication No. 2006-129067 adopts the adaptive quantization method, which sets smaller quantization parameters for a flat part based on the activities of macroblocks. In the adaptive quantization method based on activities, the image quality of a flat region where degradation of subjective image quality tends to stand out can be improved.

In the inter-frame prediction, degradation of subjective image quality tends to stand out in a region with a large predictive residual. However, since there is no correlation between the activities and predictive residuals, it is difficult for the adaptive quantization method based on activities to improve the image quality of a region with a large predictive residual. Therefore, implementation of a novel technique for eliminating degradation of subjective image quality in a region with a large predictive residual is demanded.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a video encoding apparatus comprising: a motion vector calculation module configured to calculate motion vectors for respective blocks in an input image; a motion boundary detection module configured to detect a motion boundary between a motion region and a still region in the input image based on the motion vectors of the respective blocks; and a quantization parameter setting module configured to set a value of a quantization parameter used to quantize a block that borders the detected motion boundary to a value smaller than a value which is set when the block does not border the motion boundary in accordance with a detection result of the motion boundary.

A video encoding apparatus according to an embodiment of the invention is configured to input a bitstream of video data, and to encode this bitstream of the video data (input image signal). The video data is encoded by MPEG2 or H.264. This video encoding apparatus is implemented as, for example, a personal computer or an embedded system built into various kinds of electronic apparatuses.

Figure 1:
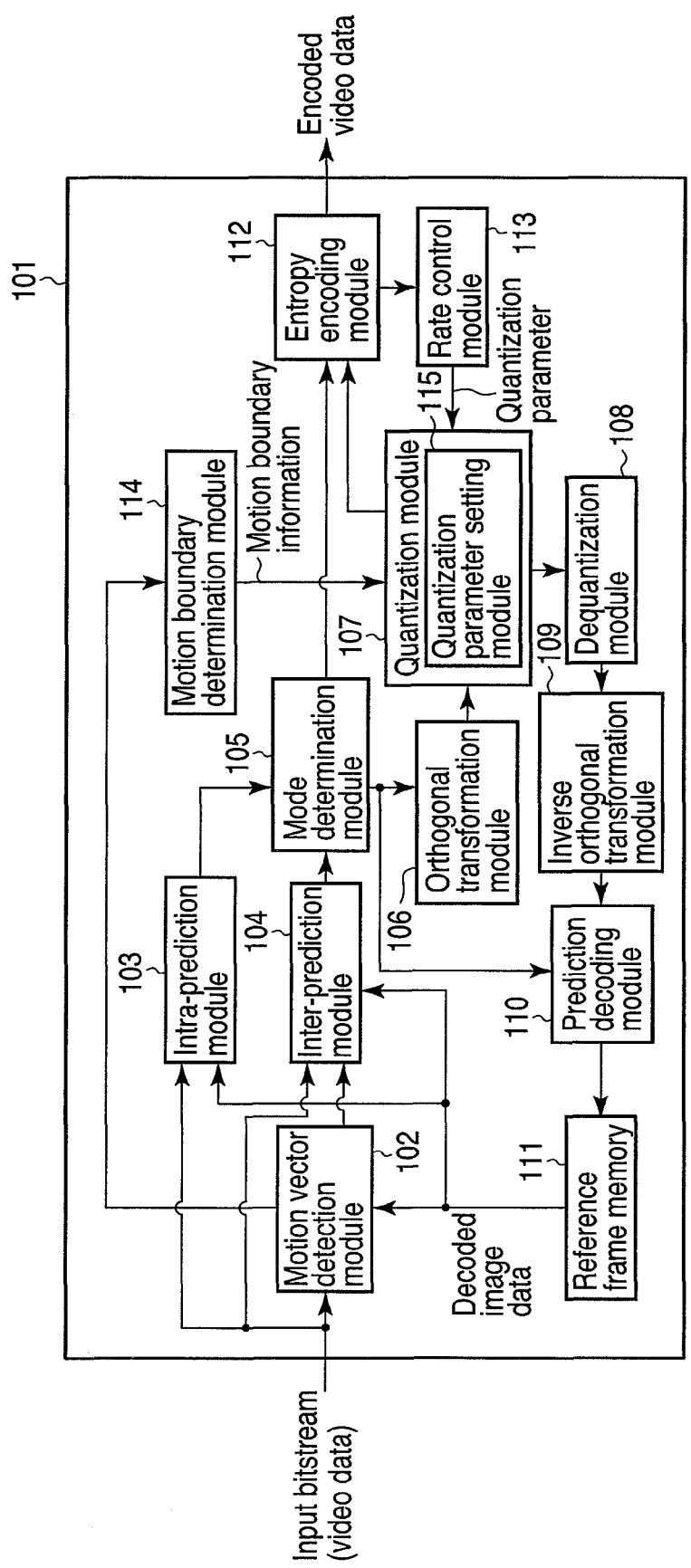
FIG. 1 is an exemplary block diagram showing the arrangement of a video encoding apparatus according to an embodiment of the invention.

The arrangement of a video encoding apparatus 101 according to this embodiment will be described below with reference to FIG. 1. The video encoding apparatus 101 includes a motion vector detection module 102, intra-prediction module 103, inter-prediction module 104, mode determination module 105, orthogonal transformation module 106, quantization module 107, dequantization module 108, inverse orthogonal transformation module 109, prediction decoding module 110, reference frame memory 111, entropy encoding module 112, rate control module 113, and motion boundary determination module 114.

The motion vector detection module 102 externally receives an input image signal (video data). The motion vector detection module 102 calculates motion vectors for respective blocks in an input image (input image frame) to be encoded. More specifically, the motion vector detection module 102 reads decoded image data stored in the reference frame memory 111, and calculates motion vectors for respective blocks obtained by dividing each image frame of an input bitstream into blocks each having a predetermined number of pixels. The motion vector detection module 102 determines optimal motion compensation parameters based on the input image and decoded image data. The motion compensation parameters include motion vectors, shapes of motion-compensated prediction blocks, and a selection method of a reference frame.

The intra-prediction module 103 externally receives the input image signal (video data) as in the motion vector detection module 102. The intra-prediction module 103 reads locally decoded image data of an encoded region in the current frame stored in the reference frame memory 111, and executes motion compensation processing based on intra-frame prediction.

The inter-prediction module 104 executes inter-frame prediction motion compensation processing. The inter-prediction module 104 receives the input image signal and the optimal motion compensation parameters determined by the motion vector detection module 102. The inter-prediction module 104 reads decoded image data stored in the reference frame memory 111.

The inter-prediction module 104 executes inter-frame amplitude compensation processing for the read decoded image data (reference image) by multiplication of weighting coefficients, addition of offsets and the like using the motion compensation parameters. The inter-prediction module 104 generates predictive residual signals in correspondence with a luma signal and chroma signals. That is, the inter-prediction module 104 generates a prediction signal corresponding to a block to be encoded from the reference image based on the motion vector corresponding to the block. The inter-prediction module 104 generates a predictive residual signal by subtracting the prediction signal from the image signal of the block.

The mode determination module 105 receives the motion compensation processing results from the intra-prediction module 103 and inter-prediction module 104, and determines an optimal encoding mode from one or more prediction mode candidates based on encoding cost calculated from these results.

The orthogonal transformation module 106 calculates orthogonal transformation coefficients by applying orthogonal transformation processing to the predictive residual signal based on the encoding mode determined by the mode determination module 105.

The motion boundary determination module 114 detects a motion boundary as a boundary between a motion region and still region for each block using the motion vectors detected by the motion vector detection module 102. The motion region is a region with motion, while the still region is a region with only small motion, if any. For example, it is determined that a block having a motion vector, the magnitude of which is larger than a predetermined threshold, belongs to a motion region. It is determined that a block having a motion vector, the magnitude of which is less than or equal to this threshold, belongs to a still region. When a motion difference between the motion vector of a target block and each of those of surrounding blocks is larger than a first threshold, and when the magnitude of any of the motion vector of the target block and those of the surrounding blocks is smaller than a second threshold, the motion boundary determination module 114 detects the target block as a block which borders the motion boundary. Note that the motion boundary determination module 114 may further detect the surrounding blocks as those which border the motion boundary.

Note that the difference between the motion vector of the target block and each of those of the surrounding blocks can be calculated by, for example, separating each motion vector into vertical and horizontal components. The motion boundary determination module 114 calculates the difference between horizontal components of motion vectors of two blocks which are juxtaposed horizontally. When this difference is larger than the first threshold, and the magnitude of one of the two motion vectors is smaller than the second threshold, the motion boundary determination module 114 determines that the boundary between the two blocks juxtaposed horizontally is a motion boundary. Also, the motion boundary determination module 114 calculates the difference between vertical components of motion vectors of two blocks juxtaposed vertically. When this difference is larger than the first threshold and the magnitude of one of the two motion vectors is smaller than the second threshold, the motion boundary determination module 114 determines that the boundary between the two blocks juxtaposed vertically is a motion boundary. The motion boundary determination module 114 outputs motion boundary information to the quantization module 107.

The rate control module 113 calculates an information amount (generated code amount) of encoded data of each block using encoded data calculated by the entropy encoding module 112 to be described later. The rate control module 113 executes rate control processing by feedback control based on the calculated information amount of encoded data for each block. That is, the rate control module 113 sets a quantization parameter for each block based on the calculated information amount of encoded data for each block.

The quantization module 107 receives the orthogonal transformation coefficients calculated by the orthogonal transformation module 106, the quantization parameters determined by the rate control module 113, and the motion boundary information detected by the motion boundary determination module 114. The quantization module 107 includes a quantization parameter setting module 115 which adaptively controls the values of quantization parameters applied to blocks (macroblocks) in accordance with the motion boundary information. When a target block (e.g., a block to be encoded) is a block which borders the motion boundary based on the motion boundary information, this quantization parameter setting module 115 re-sets a quantization parameter to a value smaller than that set by the rate control module 113. When a target block is not a block which borders the motion boundary, the quantization parameter setting module 115 keeps the quantization parameter as a value set by the rate control module 113. The quantization module 107 executes quantization processing of an orthogonal transformation coefficient output from the orthogonal transformation module 106 using this quantization parameter, thus calculating a quantized orthogonal transformation coefficient.

The entropy encoding module 112 executes entropy encoding processing using variable-length encoding, arithmetic encoding or the like to the quantized orthogonal transformation coefficients. Furthermore, the entropy encoding module 112 also executes entropy encoding processing to the encoding mode information such as the motion vectors. The entropy encoding module 112 outputs the quantized orthogonal transformation coefficients and encoding mode information that have undergone the entropy encoding processing together as encoded video data.

The dequantization module 108, inverse orthogonal transformation module 109, and prediction decoding module 110 execute processing for calculating a decoded image signal by decoding the quantized orthogonal transformation coefficients, and storing the decoded image signal in the reference frame memory 111.

The dequantization module 108 calculates orthogonal transformation coefficients by applying dequantization processing to the quantized orthogonal transformation coefficients. The inverse orthogonal transformation module 109 calculates residual error signals by applying inverse orthogonal transformation processing to the calculated orthogonal transformation coefficients. The prediction decoding module 110 receives the encoding mode information input from the mode determination module 105, and the calculated residual error signals, and generates a decoded image signal based on these pieces of information.

That is, the dequantization module 108, inverse orthogonal transformation module 109, and prediction decoding module 110 execute local decoding processing for the quantized orthogonal transformation coefficients generated from the input bitstream, and store the processing result as a decoded image signal in the reference frame memory 111. The decoded image signal stored in the reference frame memory 111 is used as a reference frame in the motion-compensated prediction.

Figure 2:
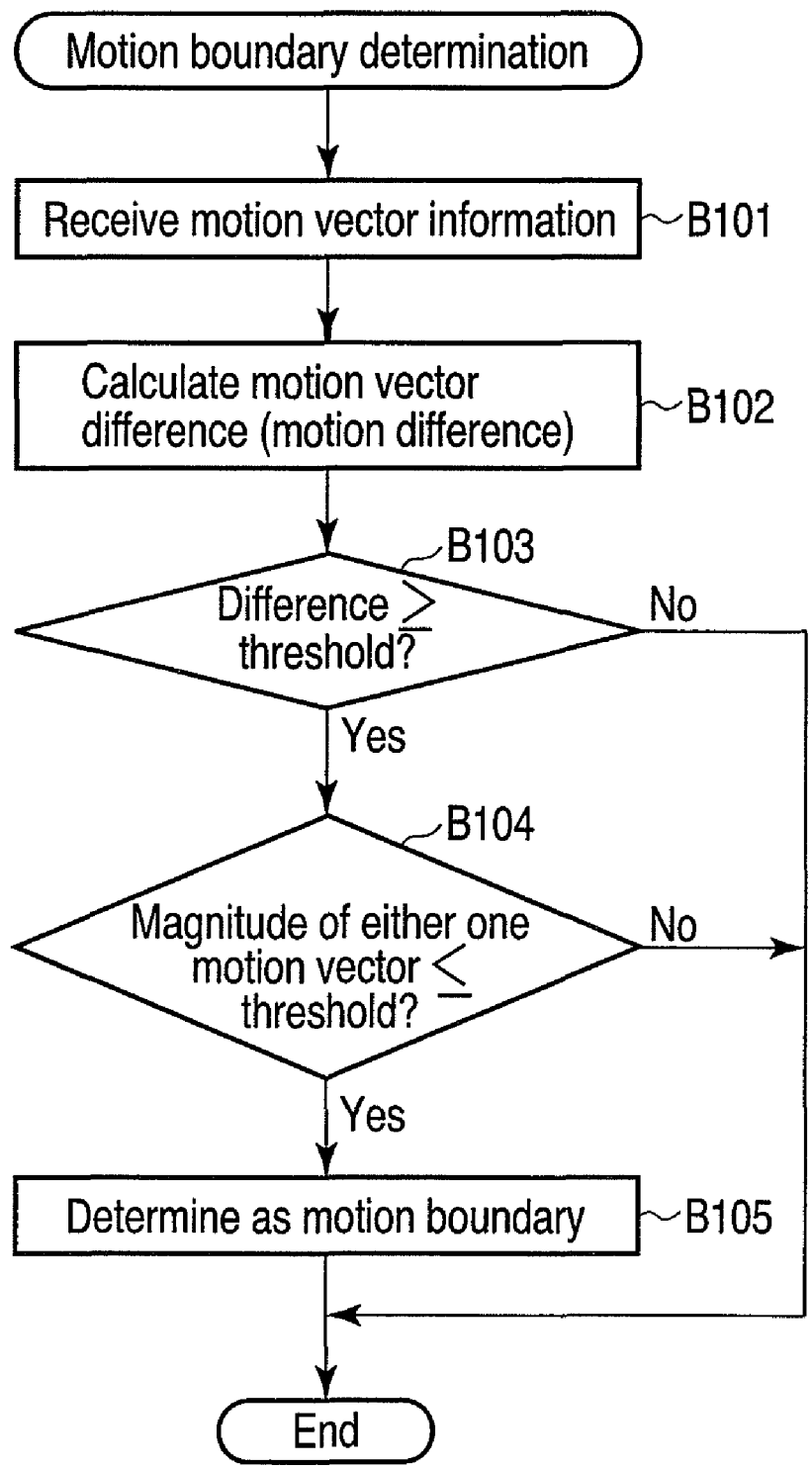
FIG. 2 is an exemplary flowchart showing the procedure of motion boundary detection processing to be executed by the video encoding apparatus according to the embodiment.

The procedure of processing in the motion boundary determination module 114 will be described below with reference to the flowchart shown in FIG. 2. The processing in the motion boundary determination module 114 is executed for respective blocks such as macroblocks.

The motion boundary determination module 114 receives motion vector information from the motion vector detection module 102 (block B101). The motion vector information used in motion boundary determination includes a motion vector $MV_{cur}$ of a target block, and those of blocks around the target block.

The motion boundary determination module 114 calculates the differences (motion differences) between the motion vector $MV_{cur}$ of the target block, and the motion vectors of one or more surrounding blocks (to be also referred to as neighboring blocks hereinafter) (block B102). The difference between the motion vector of the target block and that of each surrounding block is calculated while, for example, separating each motion vector into vertical and horizontal components, as described above. The motion boundary determination module 114 calculates the difference between horizontal components of motion vectors of two blocks juxtaposed horizontally. Also, the motion boundary determination module 114 calculates the difference between vertical components of motion vectors of two blocks juxtaposed vertically.

The motion boundary determination module 114 selects a maximum value from one or more motion vector difference values calculated in block B102, and determines if the selected maximum value of the difference is greater than or equal to threshold MV_DIFF_TH (block B103). If the selected maximum value of the difference is less than MV_DIFF_TH (NO in block B103), the motion boundary determination module 114 determines that the target block is not a block that borders a motion boundary, thus ending the processing.

If the selected maximum value of the difference is greater than or equal to MV_DIFF_TH (YES in block B103), the motion boundary determination module 114 selects a minimum value from the magnitudes of the motion vectors of one or more surrounding blocks and a magnitude $|MV_{cur}|$ of the motion vector of the target block, and determines if this minimum value is less than or equal to a preset threshold MV_SIZE_TH (block B104). If the selected minimum value is greater than the threshold MV_SIZE_TH (NO in block B104), the motion boundary determination module 114 determines that the target block is not a block that borders a motion boundary, thus ending the processing.

If the selected minimum value is less than or equal to the threshold MV_SIZE_TH (YES in block B104), the motion boundary determination module 114 determines that the target block is a block that borders a motion boundary, and outputs motion boundary information indicating that the target block is a block that borders a motion boundary to the quantization module 107 (block B105).

With the aforementioned processing, whether or not the target block is a block that borders the motion boundary is determined, and motion boundary information indicating this information is output to the quantization module 107.

Note that as the surrounding blocks, those appropriate to processing such as four or eight neighboring blocks of the target block may be set. The maximum value of the motion vector differences used in block B103 and the minimum value of the motion vector magnitudes used in block B104 may be respectively replaced by an average value or median as needed.

Figure 3:
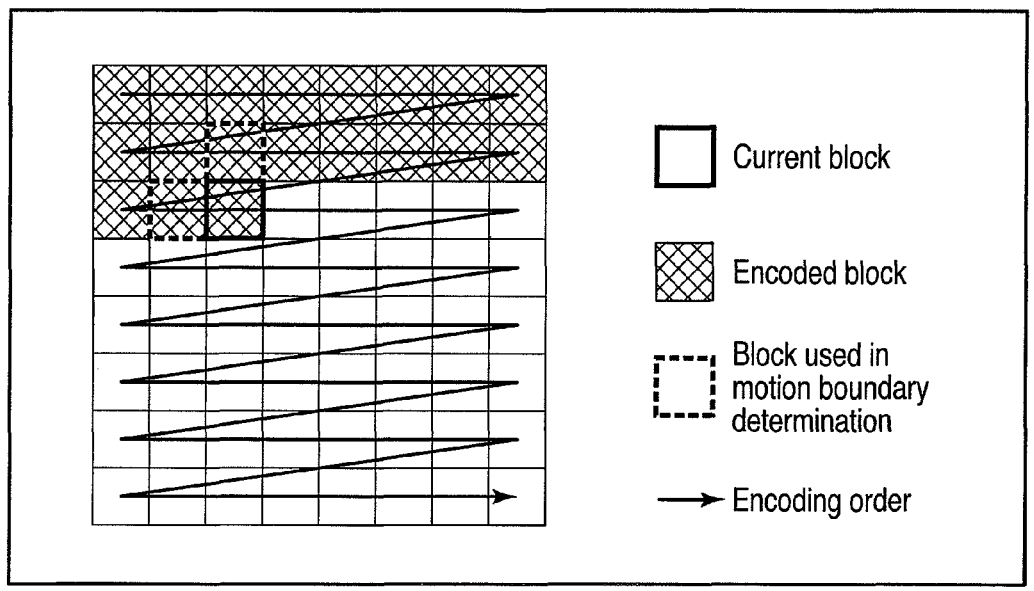
FIG. 3 is an exemplary view for explaining blocks of an image frame to be encoded by the video encoding apparatus according to the embodiment.

FIG. 3 shows an example of the encoding order upon executing encoding processing for respective blocks with respect to each image frame of video data.

Each image frame is divided into blocks each including a predetermined number of pixels. Encoding for respective blocks is executed in the same order as a raster-scan order, as indicated by an arrow in FIG. 3. Therefore, in blocks (hatched region in FIG. 3) encoded before the current target block indicated by the bold frame in FIG. 3, motion vectors have already been calculated.

In this case, using a block which borders the left side of the current target block (block to be encoded) and that which borders the upper side of the current target block, i.e., encoded blocks, the motion vectors of which have already been calculated, of those which border the current target block, whether or not the boundary between the target block and the encoded block which borders the left or upper side is a motion boundary is determined.

Note that after the motion vectors are calculated for all blocks in an image frame, whether or not the boundary between the target block and each of all blocks which border the target block is a motion boundary may be determined.

Figure 4:
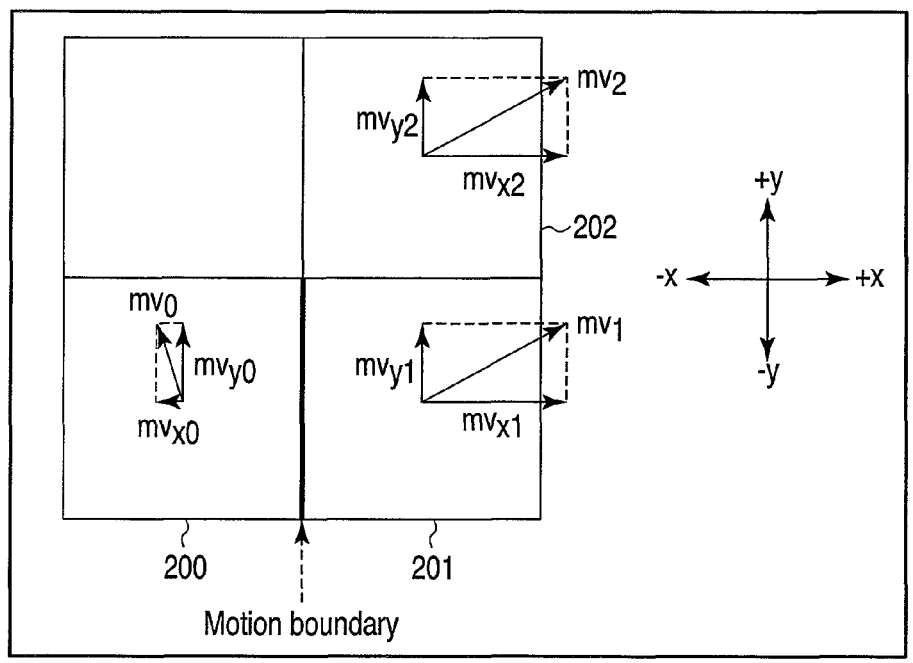
FIG. 4 is an exemplary view showing an example in which a boundary between blocks juxtaposed horizontally is detected as a motion boundary in the video encoding apparatus according to the embodiment.
Figure 5:
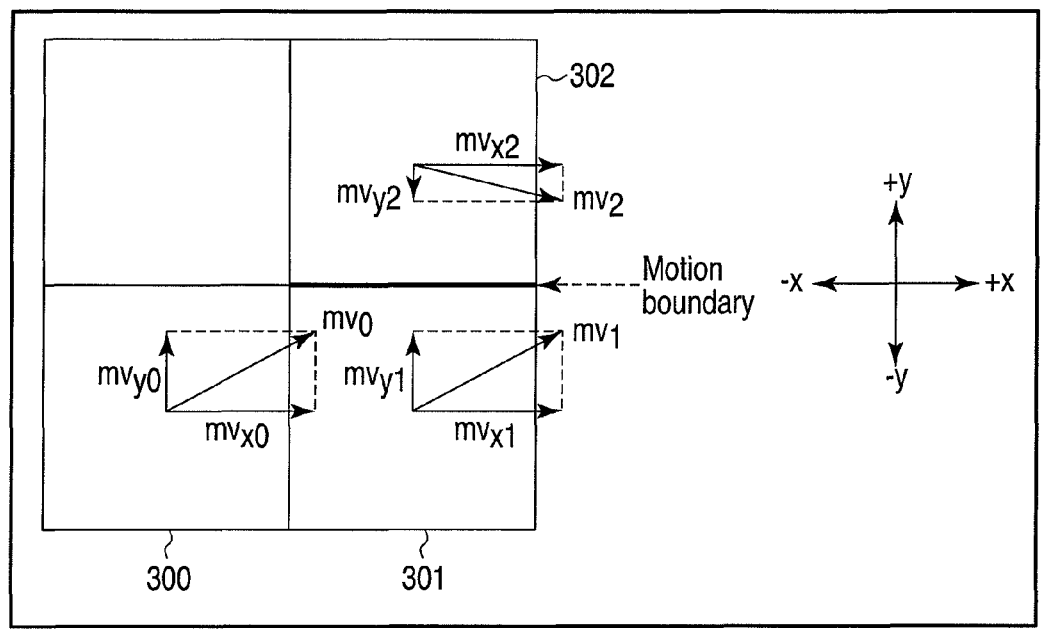
FIG. 5 is an exemplary view showing an example in which a boundary between blocks juxtaposed vertically is detected as a motion boundary in the video encoding apparatus according to the embodiment.
Figure 6:
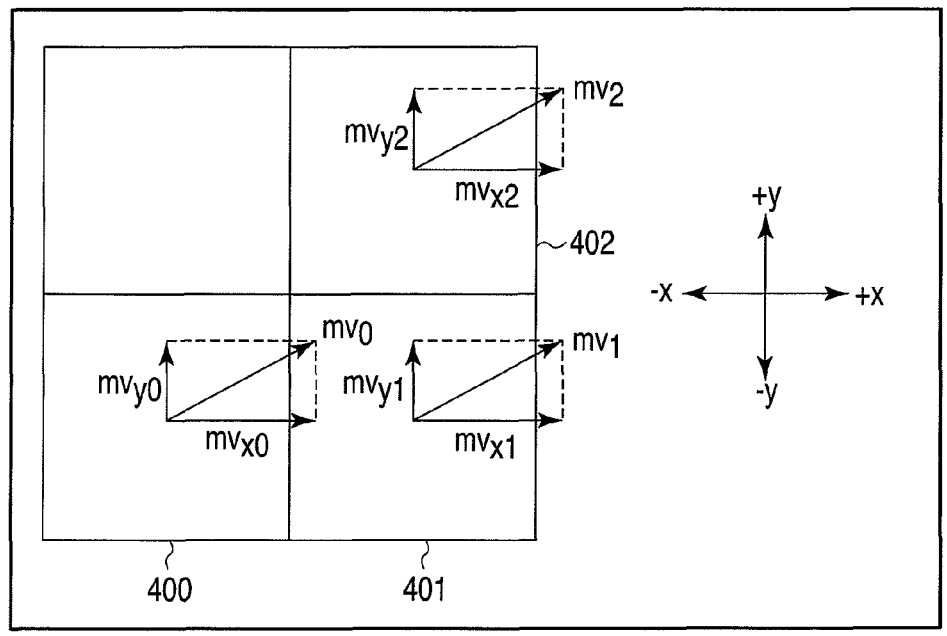
FIG. 6 is an exemplary view showing an example in which a boundary between blocks is not detected as a motion boundary in the video encoding apparatus according to the embodiment.

FIGS. 4 to 6 show an example in which motion boundaries are detected based on the motion vector of the target block and those of blocks which border the upper side and left side of the target block. The boundary between two blocks is detected as a motion boundary when the motion difference between the motion vectors of the respective blocks is large, i.e., when directions pointed by the two motion vectors, and their magnitudes have differences.

In FIG. 4, a block 200 borders the left side of a target block 201, and a block 202 borders the upper side of the target block

201. Let $mv_1$, $mv_0$, and $mv_2$ be the motion vectors of the target block 201, left neighboring block 200, and upper neighboring block 202, respectively.

Upon determining whether or not the boundary between the target block 201 and the left neighboring block 200 is a motion boundary, the horizontal component $mv_{x1}$ of the motion vector of the target block 201 and the horizontal component $mv_{x0}$ of the motion vector of the left neighboring block 200 are used. When the difference between $mv_{x1}$ and $mv_{x0}$ is greater than or equal to the first threshold, and one of the magnitudes of $mv_{x1}$ and $mv_{x0}$ is less than or equal to the second threshold, the boundary between the target block 201 and left neighboring block 200 is detected as a motion boundary.

In FIG. 4, since the difference between $mv_{x1}$ and $mv_{x0}$ is greater than or equal to the first threshold, and the magnitude of $mv_{x0}$ is less than or equal to the second threshold, the boundary between the target block 201 and left neighboring block 200 is detected as a motion boundary. Also, the target block 201 and left neighboring block 200 are detected as blocks which border the motion boundary.

On the other hand, upon determining whether or not the boundary between the target block 201 and the upper neighboring block 202 is a motion boundary, the vertical component $mv_{y1}$ of the motion vector of the target block 201 and the vertical component $mv_{y2}$ of the motion vector of the upper neighboring block 202 are used. When the difference between $mv_{y1}$ and $mv_{y2}$ is greater than or equal to the first threshold, and one of the magnitudes of $mv_{y1}$ and $mv_{y2}$ is less than or equal to the second threshold, the boundary between the target block 201 and upper neighboring block 202 is detected as a motion boundary.

In FIG. 4, since the difference between $mv_{y1}$ and $mv_{y2}$ is less than the first threshold, and both the magnitude of $mv_{y1}$ and that of $mv_{y2}$ are greater than the second threshold, the boundary between the target block 201 and upper neighboring block 202 is not detected as a motion boundary.

In FIG. 5, a block 300 borders the left side of a target block 301, and a block 302 borders the upper side of the target block 301. Let $mv_1$, $mv_0$, and $mv_2$ be the motion vectors of the target block 301, left neighboring block 300, and upper neighboring block 302, respectively. In FIG. 5 as well, whether or not the boundary between blocks is a motion boundary is determined by the aforementioned motion boundary determination method.

Upon determining whether or not the boundary between the target block 301 and the left neighboring block 300 is a motion boundary, since the difference between $mv_{x1}$ and $mv_{x0}$ is less than the first threshold, and both the magnitude of $mv_{x1}$ and that of $mv_{x0}$ are greater than the second threshold, the boundary between the target block 301 and left neighboring block 300 is not detected as a motion boundary.

Also, upon determining whether or not the boundary between the target block 301 and upper neighboring block 302 is a motion boundary, since the difference between $mv_{y1}$ and $mv_{y2}$ is greater than or equal to the first threshold, and the magnitude of $mv_{y2}$ is less than or equal to the second threshold, the boundary between the target block 301 and upper neighboring block 302 is detected as a motion boundary. Also, the target block 301 and upper neighboring block 302 are detected as blocks which border the motion boundary.

In FIG. 6, a block 400 borders the left side of a target block 401, and a block 402 borders the upper side of the target block 401. Let $mv_1$, $mv_0$, and $mv_2$ be the motion vectors of the target block 401, left neighboring block 400, and upper neighboring block 402, respectively. All these motion vectors $mv_1$, $mv_0$, and $mv_2$ point to an identical direction, and have an identical magnitude. That is, all these blocks have an identical motion from corresponding blocks in the previous reference frame, and it is estimated that, for example, these three blocks are located on an identical object. Therefore, upon determining whether or not the boundary between blocks is a motion boundary by the aforementioned motion boundary determination method using these motion vectors, the boundaries between the blocks are not detected as motion boundaries.

Figure 7:
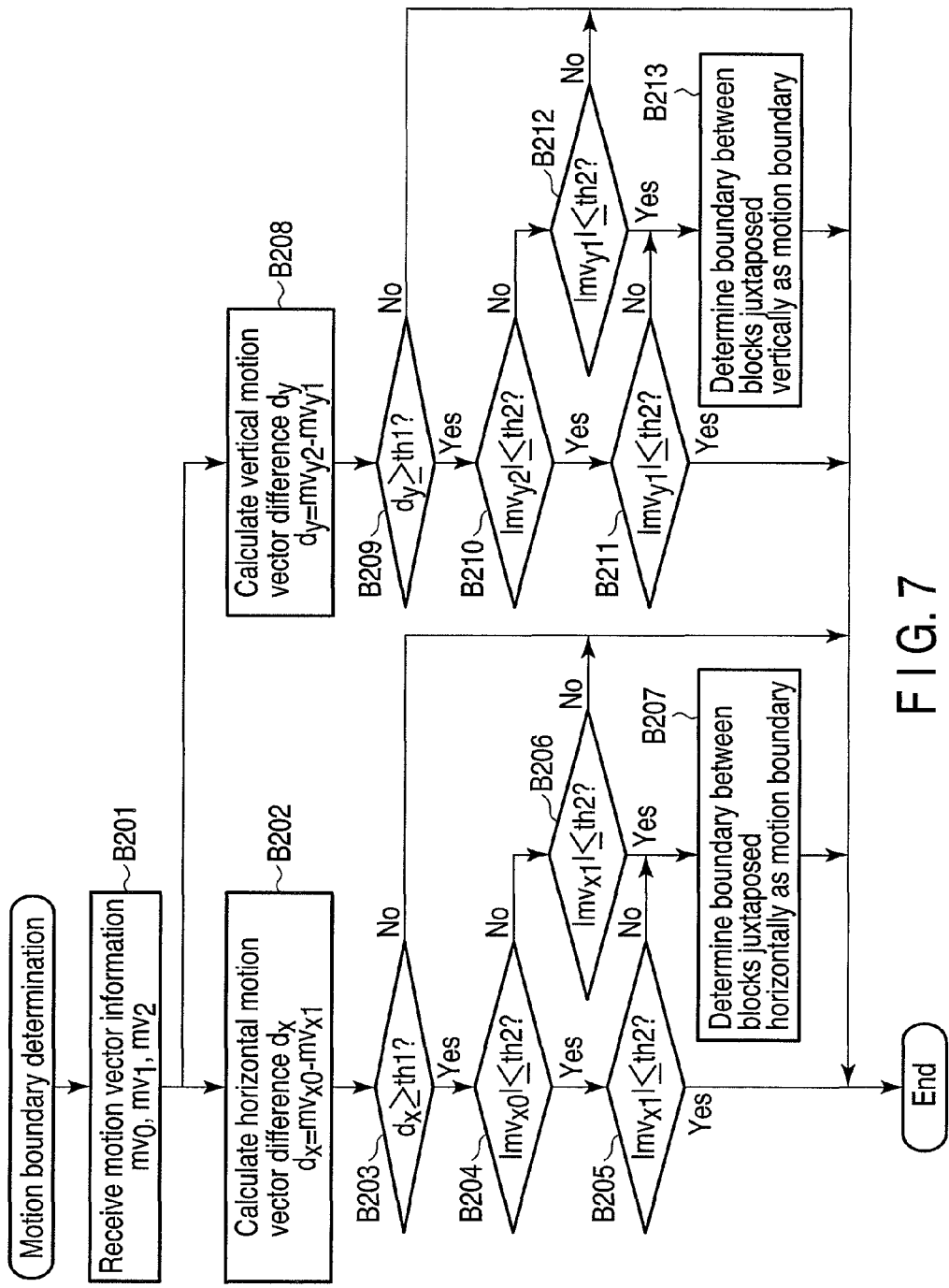
FIG. 7 is an exemplary flowchart showing another procedure of motion boundary detection processing to be executed by the video encoding apparatus according to the embodiment.

FIG. 7 is a flowchart showing the procedure of the motion boundary determination processing by the motion boundary determination module 114 for a target block and left and upper neighboring blocks of the target block.

The motion boundary determination module 114 receives, from the motion vector detection module 102, information of a motion vector $mv_1$ of a target block, a motion vector $mv_0$ of a block which borders the left side of the target block, and a motion vector $mv_2$ of a block which borders the upper side of the target block (block B201).

The motion boundary determination module 114 executes processing for determining whether or not the boundary between the blocks juxtaposed horizontally is a motion boundary (blocks B202 to B207) and processing for determining whether or not the boundary between the blocks juxtaposed vertically is a motion boundary (blocks B208 to B213). That is, the motion boundary determination module 114 determines whether or not the boundary between the target block and block that borders the left side of the target block is a motion boundary, and whether or not the boundary between the target block and block that borders the upper side of the target block is a motion boundary.

The motion boundary determination module 114 calculates a horizontal motion vector difference $d_x$ as the difference between the horizontal component $mv_{x1}$ of the vector of the target block and the horizontal component $mv_{x0}$ of the vector of the block which borders the left side of the target block (block B202). That is, the horizontal motion vector difference $d_x$ is calculated by:

$$d_x = mv_{x0} - mv_{x1}$$

the motion boundary determination module 114 determines whether or not the calculated horizontal motion vector difference $d_x$ is greater than or equal to a threshold $th_1$ (block B203). If the horizontal motion vector difference $d_x$ is greater than or equal to threshold $th_1$ (YES in block B203), i.e., $$d_x \geq th_1$$

the motion boundary determination module 114 determines whether or not the magnitude of one of the horizontal component $mv_{x1}$ of the vector of the target block and the horizontal component $mv_{x0}$ of the vector of the block which borders the left side of the target block is less than or equal to a threshold $th_2$ (blocks B204 to B206).

If the magnitude of the horizontal component $mv_{x0}$ of the vector of the block that borders the left side of the target block is less than or equal to threshold $th_2$ (YES in block B204), and if the magnitude of the horizontal component $mv_{x1}$ of the vector of the target block is greater than threshold $th_2$ (NO in block B205), i.e., $$|mv_{x0}| \leq th_2$$

and $$|mv_{x1}| > th_2$$

or if the magnitude of the horizontal component $mv_{x0}$ of the vector of the block that borders the left side of the target block is greater than threshold $th_2$ (NO in block B204), and if the magnitude of the horizontal component $mv_{x1}$ of the vector of the target block is less than or equal to threshold $th_2$ (YES in block B206), i.e., $$|mv_{x0}|>th_2$$

and $$|mv_{x1}|\leq th_2$$

the motion boundary determination module 114 determines that the boundary between the target block and the block that borders the left side of the target block as the blocks juxtaposed horizontally is a motion boundary (block B207).

Next, the motion boundary determination module 114 calculates a vertical motion vector difference $d_y$ as the difference between the vertical component $mv_{y1}$ of the vector of the target block and the vertical component $mv_{y2}$ of the vector of the block which borders the upper side of the target block (block B208). That is, the vertical motion vector difference $d_y$ is calculated by:

$$d_y=mv_{y2}-mv_{y1}$$

the motion boundary determination module 114 determines whether or not the calculated vertical motion vector difference $d_y$ is greater than or equal to threshold $th_1$ (block B209). If the vertical motion vector difference dy is greater than or equal to threshold $th_1$ (YES in block B209), i.e., $$d_y \geq th_1$$

the motion boundary determination module 114 determines whether or not the magnitude of one of the vertical component $mv_{y1}$ of the vector of the target block and the vertical component $mv_{y2}$ of the vector of the block which borders the upper side of the target block is less than or equal to threshold $th_2$ (blocks B210 to B212).

If the magnitude of the vertical component $mv_{y2}$ of the vector of the block that borders the upper side of the target block is less than or equal to threshold $th_2$ (YES in block B210), and if the magnitude of the vertical component $mv_{y1}$ of the vector of the target block is greater than threshold $th_2$ (NO in block B211), i.e., $$|mv_{y2}|\leq th_2$$

and $$|mv_{y1}|>th_2$$

or if the magnitude of the vertical component $mv_{y2}$ of the vector of the block that borders the upper side of the target block is greater than threshold $th_2$ (NO in block B210), and if the magnitude of the vertical component $mv_{y1}$ of the vector of the target block is less than or equal to threshold $th_2$ (YES in block B212), i.e., $$|mv_{y2}|>th_2$$

and $$|mv_{y1}|\leq th_2$$

the motion boundary determination module 114 determines that the boundary between the target block and the block that borders the upper side of the target block as the blocks juxtaposed vertically is a motion boundary (block B213).

With the aforementioned processing, whether or not the boundary between the blocks is a motion boundary can be determined, and blocks that border the motion boundary can be detected.

Figure 8:
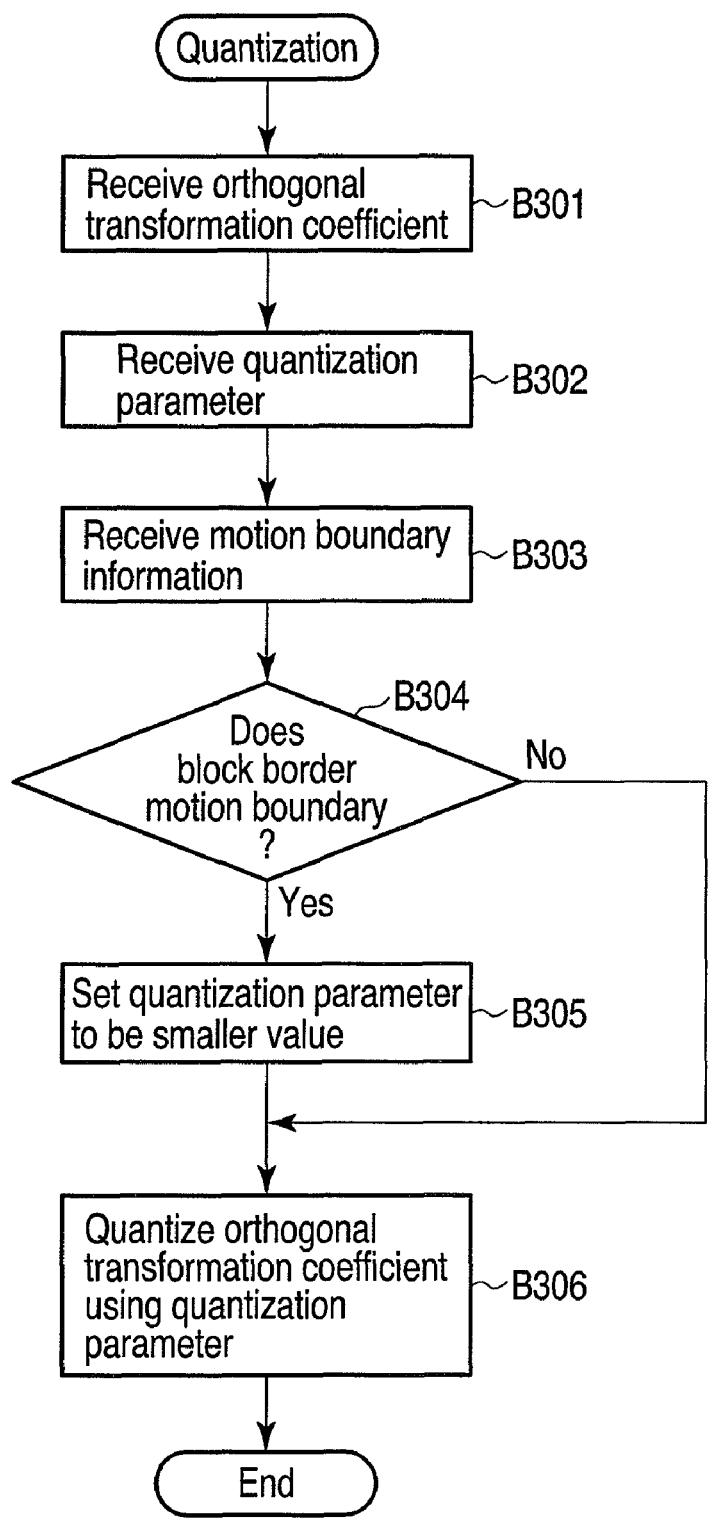
FIG. 8 is an exemplary flowchart showing the procedure of quantization processing to be executed by the video encoding apparatus according to the embodiment.

The quantization module 107 re-sets the value of a quantization parameter used in quantization of a block that borders the motion boundary to be smaller than a value which is set in advance in that block by the rate control module 113. FIG. 8 is a flowchart showing the procedure of processing for quantizing orthogonal transformation coefficients calculated by the orthogonal transformation module 106 using quantization parameters.

The quantization module 107 receives an orthogonal transformation coefficient from the orthogonal transformation module 106 (block B301). The quantization module 107 receives a quantization parameter set by the rate control module 113 (block B302). The quantization module 107 receives motion boundary information from the motion boundary determination module 114 (block B303).

Next, the quantization module 107 determines based on the motion boundary information whether or not a block to be encoded is a block that borders the motion boundary (block B304).

If the block to be encoded borders the motion boundary (YES in block B304), the quantization module 107 re-sets the value of the quantization parameter, which is received from the rate control module 113 and is to be applied to the block to be encoded, to a value smaller than that value (block B305). That is, when the block to be encoded borders the motion boundary, the quantization module 107 uses a value smaller than that of the quantization parameter received from the rate control module 113 in the quantization processing of the block to be encoded.

On the other hand, if the block to be encoded does not border the motion boundary (NO in block B304), the quantization module 107 uses the value of the quantization parameter received from the rate control module 113 intact in the quantization processing of the block to be encoded.

The quantization module 107 executes the quantization processing for the orthogonal transformation coefficients using the quantization parameters set by the aforementioned processing (block B306). Therefore, each orthogonal transformation coefficient corresponding to the block to be encoded that borders the motion boundary is quantized by a relatively small quantization step width.

With the aforementioned processing, the quantization module 107 executes the quantization processing for an orthogonal transformation coefficient using a quantization parameter, which is set depending on whether or not the block to be encoded borders the motion boundary, thereby calculating a quantized orthogonal transformation coefficient. Especially, when the target block borders the motion boundary, the value of the quantization parameter is re-set to be smaller than the value which is set in advance, thus finely quantizing the orthogonal transformation coefficient of the target block. That is, by controlling the quantization parameter for a block corresponding to a region in which a predictive residual is likely to increase in motion compensation by inter-frame prediction, e.g., a region immediately after a moving object has passed, degradation of image quality can be suppressed.

Figure 9:
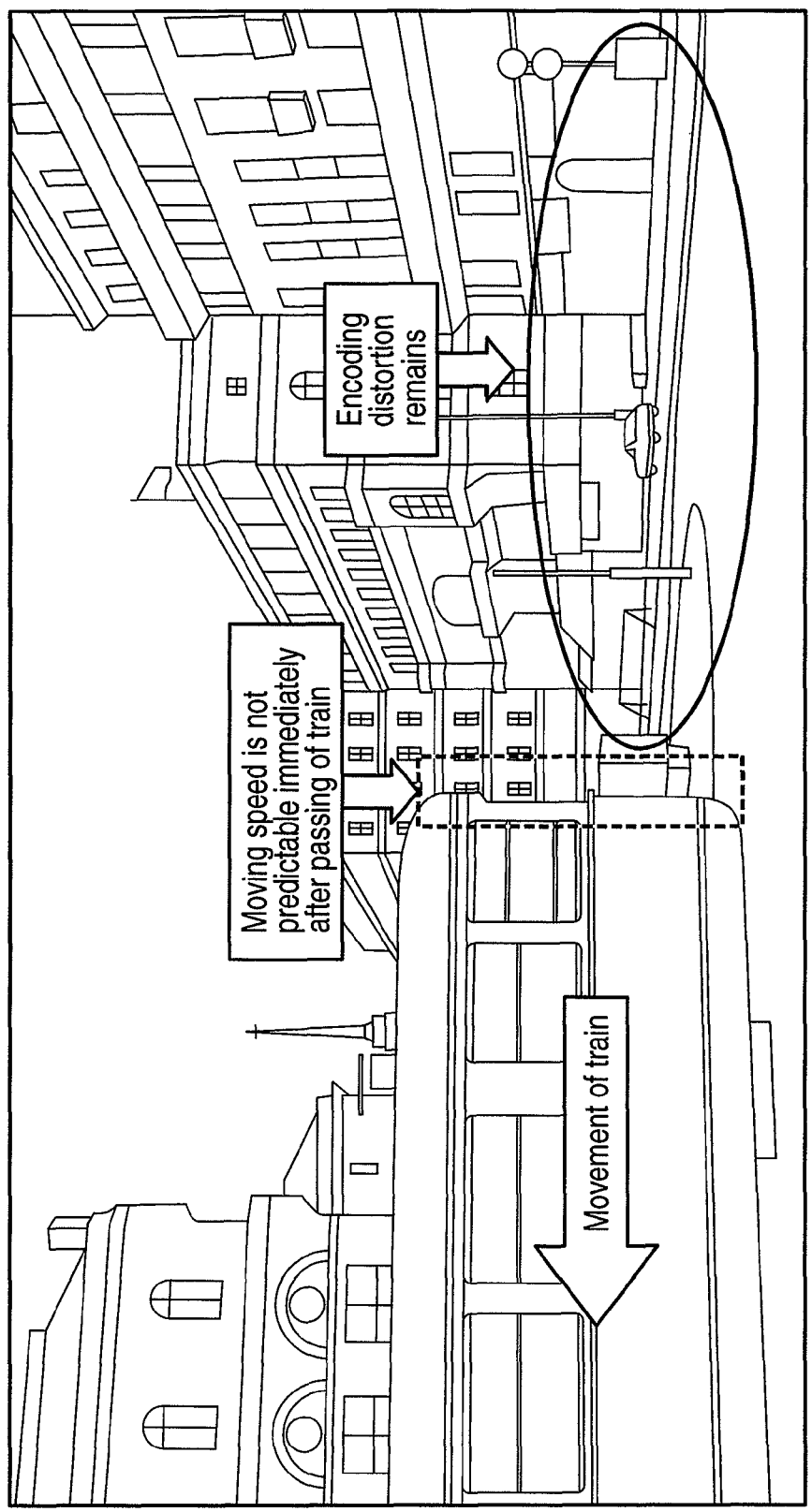
FIG. 9 is an exemplary view showing an example of an image frame which suffers image degradation due to conventional video encoding.

FIG. 9 shows an example of an image frame which suffers image degradation due to conventional video encoding.

An image frame shown in FIG. 9 is one frame in video data obtained when a train as a moving object is passing in front of a building as a still object. When video data that captures a moving object such as a train is encoded by inter-frame prediction, since a predictive residual becomes large, an encoding distortion remains in a decoded image, thus causing degradation of image quality. For example, since a region (bounded by the broken line in FIG. 9) immediately after the train has passed in the image frame is not captured in an image frame to be referred to upon encoding, motion prediction between the image frame to be encoded and the reference image frame is unlikely to succeed. Therefore, a large value is set as a predictive residual.

The vicinity of a region bounded by the solid line in FIG. 9 indicates a region where the train has passed in image frames of video data, and encoding distortion tends to occur in conventional encoding. Hence, the video encoding apparatus 101 of this embodiment execute processing for detecting, using motion vectors calculated for respective blocks in an image frame, a region with a large predictive residual like the region immediately after the train has passed, i.e., motion boundaries as boundaries between motion and still regions for respective blocks, and reducing an encoding distortion as a result of conventional encoding.

Figure 10:
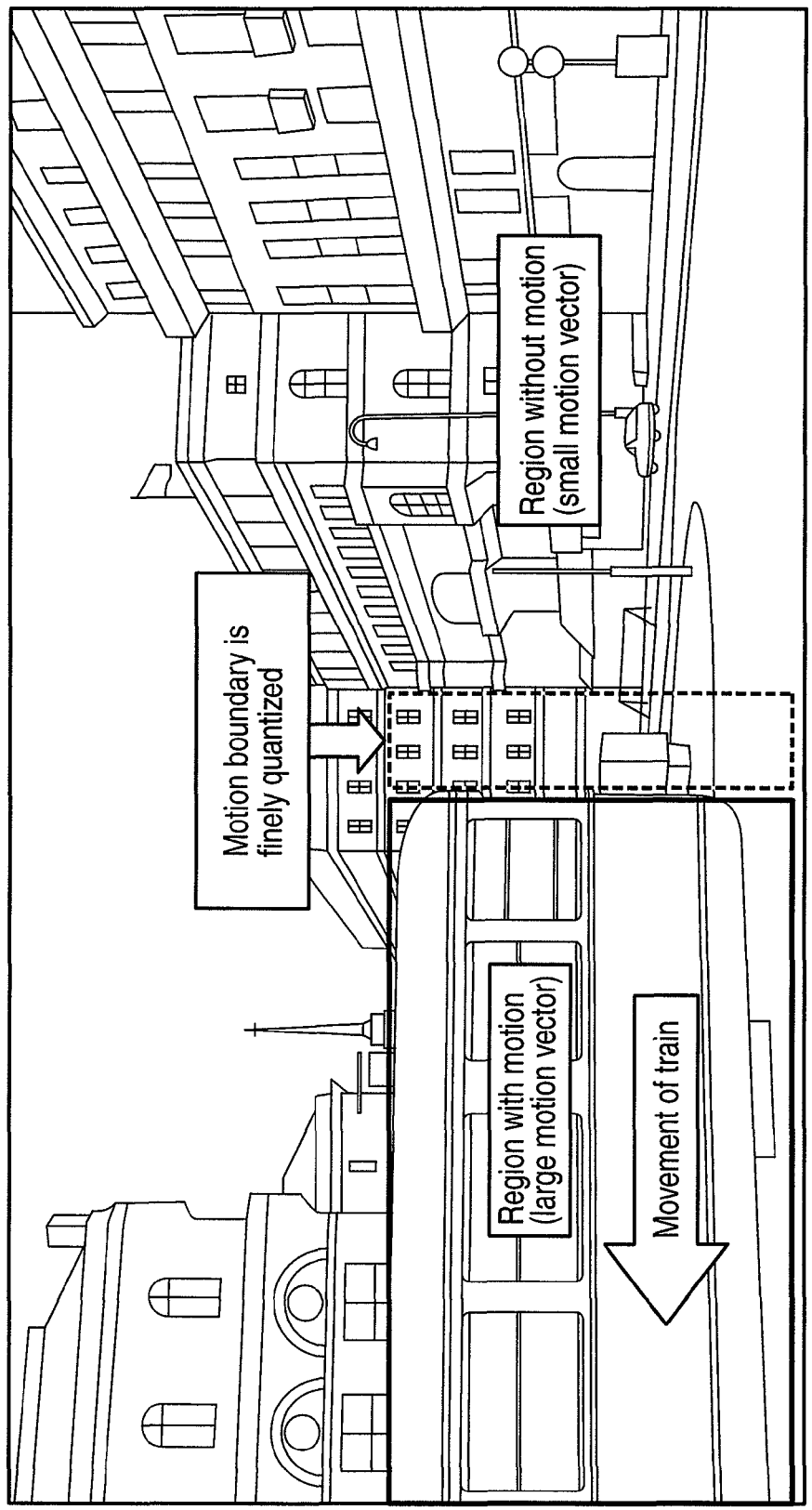
FIG. 10 is an exemplary view showing an example of a motion boundary detected by the video encoding apparatus according to the embodiment.

FIG. 10 shows an example of a motion boundary detected by the motion boundary determination module 114. A region obtained by capturing still objects such as buildings and a road in an image frame is a region in which the magnitude of each motion vector is small, i.e., no motion is included (or a small motion is included). On the other hand, a region obtained by capturing a moving object such as a train in the image frame (a region bounded by the solid line in FIG. 10) is a region where the magnitude of each motion vector is large, i.e., a motion is included (or a large motion is included). The motion boundary determination module 114 detects the boundary between these two regions (a region bounded by the broken line in FIG. 10) as a motion boundary.

The quantization module 107 of the video encoding apparatus 101 re-sets the value of a quantization parameter used to quantize a block which borders the detected motion boundary to be smaller than a value set in advance by the rate control module 113, thereby finely quantizing the orthogonal transformation coefficient of that block.

As described above, according to this embodiment, the motion difference between blocks juxtaposed horizontally is calculated in consideration of only the difference between horizontal components of the motion vectors of these blocks, and the motion difference between blocks juxtaposed vertically is calculated in consideration of only the difference between vertical components of the motion vectors of these blocks. Therefore, when the moving object such as the train is moving horizontally, as shown in FIG. 10, a boundary between the moving object and a region on the upper side of the moving object is not detected as a motion boundary, and only a region that appears immediately after movement of the moving object (a region behind the train) can be detected as a motion boundary. Therefore, the image quality of a region where a predictive residual is likely to increase can be efficiently improved.

Respective blocks which border the motion boundary, e.g., two blocks juxtaposed to sandwich the motion boundary are finely quantized by setting smaller values of their quantization parameters. As a result, upon decoding and playing back the encoded video data, subjective image quality perceived by a viewer can be improved. Of course, the values of respective quantization parameters to be applied to two blocks juxtaposed to sandwich the motion boundary need not be set to be smaller. For example, only the value of a quantization parameter to be applied to a block which borders the motion boundary and includes a small motion may be set to be smaller.

Figure 11:
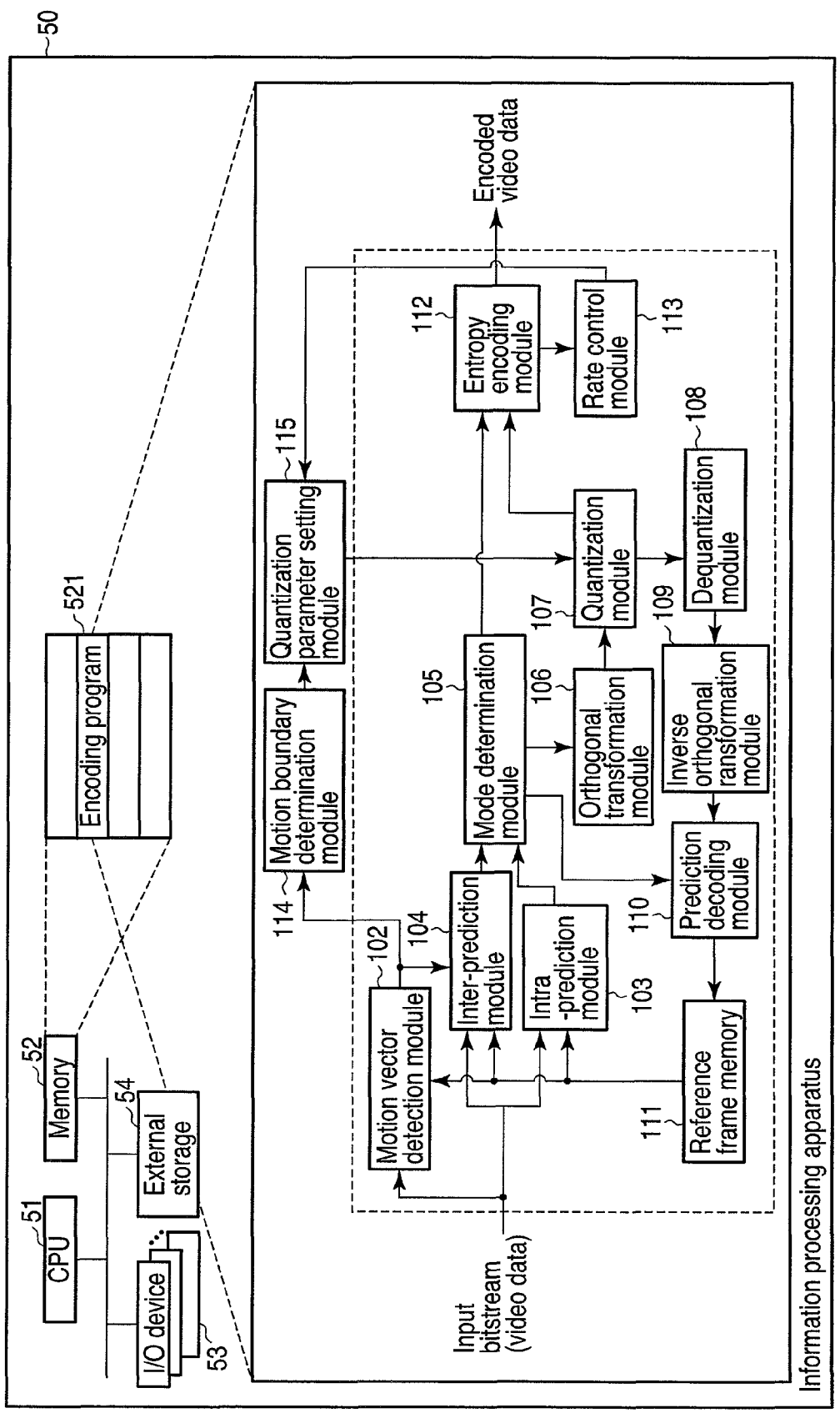
FIG. 11 is an exemplary block diagram showing the arrangement of an information processing apparatus according to an embodiment of the invention.

FIG. 11 is a block diagram showing the arrangement of an information processing apparatus which includes the video encoding processing of this embodiment as a program. This information processing apparatus 50 is implemented as, for example, a personal computer or an embedded system built into various kinds of electronic apparatuses.

The information processing apparatus 50 includes a CPU 51, memory 52, I/O device 53, and external storage device 54.

The CPU 51 is a processor which executes various programs. The CPU 51 executes various kinds of arithmetic processing, and controls respective modules in the information processing apparatus 50.

The memory 52 is a main memory used to store an operating system and application programs, which are executed by the CPU 51, and various data. In the memory 52, a video encoding program 521 for encoding video data is loaded.

The I/O device 53 includes various input/output devices for implementing inputs and outputs of data with respect to the information processing apparatus 50. The external storage device 54 is a nonvolatile storage device used to store various programs and data. Various programs and data stored in the external storage device 54 are loaded into the memory 52 in response to requests from respective modules in the information processing apparatus 50.

The video encoding program 521 loaded into the memory 52 is a program for executing processing for encoding video data, as described above. In the video encoding program 521, respective processing modules bounded within the broken line frame in FIG. 11 can be implemented by a conventional video encoding program.

Using motion vectors detected by the motion vector detection module 102, the motion boundary determination module 114 outside the broken line frame in FIG. 11 detects a motion boundary as a boundary between large- and small-motion regions for respective blocks, as described above. When the motion difference between the motion vector of a target block and each of the motion vectors of surrounding blocks is larger than the first threshold, and any of the magnitudes of the motion vector of the target block and those of the surrounding blocks is smaller than the second threshold, the motion boundary determination module 114 detects the target block as a block that borders the motion boundary.

Likewise, the quantization parameter setting module 115 outside the broken line frame in FIG. 11 receives motion boundary information input from the motion boundary determination module 114, and information of quantization parameters input from the rate control module 113. The quantization parameter setting module 115 sets, based on the motion boundary information, the value of a quantization parameter used to quantize a block which borders the motion boundary to be smaller than a value set by the rate control module 113. Then, the quantization parameter setting module 115 outputs this quantization parameter to the quantization module 107.

A program for executing the procedure of the video encoding processing of this embodiment can be implemented by adding programs for executing the procedure of processes corresponding to the aforementioned motion boundary determination module 114 and quantization parameter setting module 115 to the conventional video encoding program.

As described above, according to this embodiment, the image quality of a region where a predictive residual is likely to increase in video encoding can be improved. In this embodiment, a motion boundary as a boundary between large- and small-motion regions is detected in an image frame of video data, and the value of a quantization parameter used to quantize each block that borders the detected motion boundary is set to be smaller than a preset value. By finely quantizing blocks around the motion boundary, the subjective image quality perceived by a viewer can be improved.

All the procedure of the video encoding processing of this embodiment can be implemented by software. For this reason, by installing and executing the program for implementing the procedure of the video encoding processing in a normal computer via a computer-readable storage medium, the same effects as in this embodiment can be easily achieved.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A video encoding apparatus comprising:
   a processor configured to calculate motion vectors for respective pixel blocks in an input image;
   detect a motion boundary between a motion region and a still region in the input image based on the motion vectors of the respective pixel blocks; and
   set a value of a quantization parameter for quantizing a pixel block next to the detected motion boundary smaller than a value which is set when the pixel block next to the detected motion boundary is not next to the motion boundary in accordance with a detection result of the motion boundary.

2. The video encoding apparatus of claim 1, wherein the processor is configured to detect a boundary between a target pixel block in the input image and a neighboring pixel block next to the target pixel block as the motion boundary when a motion difference between the motion vector of the target pixel block and a motion vector of the neighboring pixel block next to the target pixel block is equal to or greater than a first threshold, and either a magnitude of the motion vector of the target pixel block or a magnitude of the motion vector of the neighboring pixel block is equal to or smaller than a second threshold.

3. The video encoding apparatus of claim 1, wherein the processor is configured to detect a boundary between a target pixel block in the input image and a pixel block next to an upper side or a lower side of the target pixel block as the motion boundary when a difference between a vertical component of a motion vector of the target pixel block and a vertical component of a motion vector of the pixel block next to the upper side or the lower side is equal to or greater than a first threshold, and either a magnitude of the vertical component of the motion vector of the target pixel block or a magnitude of the vertical component of the motion vector of the pixel block next to the upper side or the lower side is equal to or smaller than a second threshold, and
   configured to detect a boundary between the target pixel block and a pixel block next to a left side or a right side of the target pixel block as the motion boundary when a difference between a horizontal component of the motion vector of the target pixel block and a horizontal component of a motion vector of the pixel block next to the left side or the right side is equal to or greater than the first threshold, and either a magnitude of the horizontal component of the motion vector of the target pixel block or a magnitude of the horizontal component of the motion vector of the pixel block next to the left side or the right side is equal to or smaller than the second threshold.

4. The video encoding apparatus of claim 1, wherein the processor is configured to determine whether a boundary between a pixel block to be encoded in the input image and an encoded first pixel block next to an upper side of the pixel block to be encoded is the motion boundary based on a vertical component of a motion vector of the pixel block to be encoded and a vertical component of a motion vector of the first pixel block, and to determine whether a boundary between the pixel block to be encoded and an encoded second pixel block next to a left side of the pixel block to be encoded is the motion boundary based on a horizontal component of the motion vector of the pixel block to be encoded and a horizontal component of a motion vector of the second pixel block, and
   configured to set a value of a quantization parameter for the pixel block to be encoded smaller than a value of a quantization parameter determined by rate control of encoded data when at least one of the boundary between the pixel block to be encoded and the first pixel block, and the boundary between the pixel block to be encoded and the second pixel block is the motion boundary.

5. The video encoding apparatus of claim 4, wherein the processor is configured to detect the boundary between the pixel block to be encoded and the first pixel block as the motion boundary when a difference between the vertical component of the motion vector of the pixel block to be encoded and the vertical component of the motion vector of the first pixel block is equal to or greater than a first threshold, and either a magnitude of the vertical component of the motion vector of the pixel block to be encoded or a magnitude of the vertical component of the motion vector of the first pixel block is equal to or smaller than a second threshold, and
   configured to detect the boundary between the pixel block to be encoded and the second pixel block as the motion boundary when a difference between the horizontal component of the motion vector of the pixel block to be encoded and the horizontal component of the motion vector of the second pixel block is equal to or greater than the first threshold, and either a magnitude of the horizontal component of the motion vector of the pixel block to be encoded or a magnitude of the horizontal component of the motion vector of the second pixel block is equal to or smaller than the second threshold.

6. A video encoding method of encoding video data, the method comprising:
   calculating motion vectors for respective pixel blocks in an input image;
   detecting a motion boundary between a motion region and a still region in the input image based on the motion vectors of the respective pixel blocks; and
   setting a value of a quantization parameter for quantizing a pixel block next to the detected motion boundary smaller than a value set when the pixel block next to the detected motion boundary is not next to the motion boundary in accordance with a detection result of the motion boundary.

7. The video encoding method of claim 6, wherein the detecting comprises detecting a boundary between a target pixel block in the input image and a pixel block next to an upper side or a lower side of the target pixel block as the motion boundary when a difference between a vertical component of a motion vector of the target pixel block and a vertical component of a motion vector of the pixel block next to the upper side or the lower side is equal to or greater than a first threshold, and either a magnitude of the vertical component of the motion vector of the target pixel block or a magnitude of the vertical component of the motion vector of the pixel block next to the upper side or the lower side is equal to or smaller than a second threshold, and detecting a boundary between the target pixel block and a pixel block next to a left side or a right side of the target pixel block as the motion boundary when a difference between a horizontal component of the motion vector of the target pixel block and a horizontal component of a motion vector of the pixel block next to the left side or the right side is equal to or greater than the first threshold, and either a magnitude of the horizontal component of the motion vector of the target pixel block or a magnitude of the horizontal component of the motion vector of the pixel block next to the left side or the right side is equal to or smaller than the second threshold.

8. A non-transitory computer-readable medium comprising a video data encoding program configured to cause a computer to:
  calculate motion vectors for respective pixel blocks in an input image;
  detect a motion boundary between a motion region and a still region in the input image based on the motion vectors of the respective pixel blocks; and
  set a value of a quantization parameter for quantizing a pixel block next to the detected motion boundary smaller than a value when the pixel block next to the detected motion boundary is not next to the motion boundary in accordance with a detection result of the motion boundary.

9. The non-transitory computer-readable medium of claim 8, wherein the video data encoding program is further configured to cause the computer to detect a motion boundary, and to:
  detect a boundary between a target pixel block in the input image and a pixel block next to an upper side or a lower side of the target pixel block as the motion boundary when a difference between a vertical component of a motion vector of the target pixel block and a vertical component of a motion vector of the pixel block next to the upper side or the lower side is equal to or greater than a first threshold, and either a magnitude of the vertical component of the motion vector of the target pixel block or a magnitude of the vertical component of the motion vector of the pixel block next to the upper side or the lower side is equal to or smaller than a second threshold; and
  detect a boundary between the target pixel block and a pixel block next to a left side or a right side of the target pixel block as the motion boundary when a difference between a horizontal component of the motion vector of the target pixel block and a horizontal component of a motion vector of the pixel block next to the left side or the right side is equal to or greater than the first threshold, and either a magnitude of the horizontal component of the motion vector of the target pixel block or a magnitude of the horizontal component of the motion vector of the pixel block next to the left side or the right side is equal to or smaller than the second threshold.

* * * * *